United States Patent [19]

Ikari et al.

[11] Patent Number: 5,935,618

[45] Date of Patent: Aug. 10, 1999

[54] APPARATUS FOR MANUFACTURING MOLDED MATERIALS SOLIDIFIED BY SULFUR

[75] Inventors: Yoshikatsu Ikari, Tokyo; Chujiro Nishida, Kawasaki; Katsuyoshi Toyofuku; Toshiyuki Kokubu, both of Saga-ken, all of Japan

[73] Assignees: Ikari-Laboratory for Environmental Science Co., Ltd., Tokyo; Nishida Mining Co., Ltd., Kanagawa-ken; Tanaka Iron Works Co., Ltd., Saga-ken, all of Japan

[21] Appl. No.: 08/878,602

[22] Filed: Jun. 19, 1997

Related U.S. Application Data

[62] Division of application No. 08/653,348, May 24, 1996, abandoned.

[30] Foreign Application Priority Data

May 26, 1995 [JP] Japan ..................................... 7-151113

[51] Int. Cl.⁶ .................................................. B29C 47/36
[52] U.S. Cl. .......................... 425/145; 425/200; 588/256; 55/315
[58] Field of Search ..................................... 425/145, 200, 425/204, 113, 114, 404; 588/256; 264/DIG. 49; 44/629, 631, 632; 55/315

[56] References Cited

U.S. PATENT DOCUMENTS

| 3,304,355 | 2/1967 | Pobst, Jr. et al. .................... 425/200 |
| 3,484,507 | 12/1969 | Smith ...................................... 425/200 |
| 4,134,775 | 1/1979 | Schwoegler . |
| 4,397,801 | 8/1983 | Minnick .................................. 264/140 |
| 5,019,310 | 5/1991 | Kobayashi ............................ 425/204 |
| 5,347,072 | 9/1994 | Adams .................................... 588/256 |
| 5,678,234 | 10/1997 | Colombo et al. ......................... 588/4 |

FOREIGN PATENT DOCUMENTS

| 1039003 | 9/1978 | Canada . |
| 37 07 257 A1 | 9/1987 | European Pat. Off. . |
| 61-15759 | 4/1986 | Japan . |
| 62-15274 | 4/1987 | Japan . |
| 812317 | 3/1981 | Russian Federation ................. 55/315 |

*Primary Examiner*—Jay H. Woo
*Assistant Examiner*—Robert A. Hopkins
*Attorney, Agent, or Firm*—Birch, Stewart, Kolasch & Birch, LLP

[57] ABSTRACT

An apparatus for manufacturing molded materials solidified by sulfur includes an apparatus for bringing the water content of a solid raw material to be mixed with sulfur, such as slag and dust resulting from steel-making, to 3% by weight or below, an apparatus for heating and kneading the mixture of raw materials including molten sulfur at 119 to 159° C., to cause the sulfur to penetrate into pore spaces on the solid raw material, thereby preparing a fluid kneaded mixture, and an apparatus for molding the mixture into a prescribed shape. Utilizing the apparatus, slag and dust resulting from steel-making, etc. is solidified with a melted sulfur thereby, enabling solidified and molded materials to be produced industrially, while preventing the generation of sulfurous acid gas. The materials' performance, such as physical strength and quality, are constant and high, and harmful heavy metals or the like will not ooze out of the materials.

16 Claims, 2 Drawing Sheets

APPARATUS FOR MANUFACTURING MOLDED MATERIALS SOLIDIFIED BY SULFUR

This application is a divisional of application Ser. No. 08/653,348, abandoned filed on May 24, 1996, the entire contents of which are hereby incorporated by reference.

FIELD OF THE INVENTION

The present invention relates to an apparatus for manufacturing molded materials made of waste such as slag and dust resulting from steel-making, and solidified by sulfur.

BACKGROUND OF THE INVENTION

Conventionally, slag and dust resulting from steel-making, as well as other industrial waste, etc., are directly discarded in a site for waste disposal because a suitable treatment method has not been found. However, recently, with a view to effectively utilizing resources and reducing waste, utilization of reclaimed resources, that is, recycling of resources, is noted and studied, and the need for establishing a concrete and practical technique for recycling of resources has been pointed out.

Under the above background, reclaiming and utilizing or solidifying and sealing industrial waste, such as fly ash and slag resulting from steel-making, has been studied in various ways. However, a satisfactory method has not yet been developed.

The present inventors, having keenly studied in various ways the method and apparatus, found that it was not always practically easy to obtain reusable molded and solidified materials by melting sulfur at high temperature and mixing it with industrial waste under high temperature, and that there were some problems in the conventional method, as follows, regarding the quality of molded materials solidified by sulfur and operations to make the molded materials.

Namely, products that resulted from solidifying fly ash with sulfur were low in physical strength and sometimes caused cracks. Further, when slag and dust resulting from steel-making were mixed with melted sulfur under high temperature for producing molded materials, in the presence of iron in the slag and dust, irritating sulfurous acid gas was often generated. This adversely affected the molding operation environment, making a deodorizing apparatus indispensable to prevent secondary pollution by the molding operation. In addition to the above, only molded materials that were unsatisfactory in physical strength were obtained, and sometimes the molded materials were cracked.

SUMMARY OF THE INVENTION

Therefore, an object of the present invention is to provide an apparatus wherein slag resulting from steel-making, dust resulting from steel-making, or the like is mixed with a molten state sulfur and is solidified thereby, enabling solidified and molded materials to be produced industrially.

Another object of the present invention is to provide an apparatus for manufacturing molded materials solidified by sulfur in which the performance, such as physical strength, and quality are high and constant, and harmful heavy metals or the like will not ooze out of the materials.

Still another object of the present invention is to provide an apparatus for producing molded materials solidified by sulfur, which can prevent the molding operation environment from being adversely affected by the generation of sulfurous acid gas, in spite of using melted sulfur with slag resulting from steel-making and dust resulting from steel-making under high temperature.

Other and further objects, features, and advantages of the invention will appear more evident from the following description, taken in connection with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention provides:

(1) A method for manufacturing molded materials solidified by sulfur, and a system of sealing harmful heavy metal species, comprising bringing the water content of a raw material to be mixed with sulfur, such as slag resulting from steel-making and dust resulting from steel-making, to 3% by weight or below, heating and kneading the mixture of raw materials including molten sulfur at a temperature in the range of from 119 to 159° C., to cause the melted sulfur to penetrate into pore spaces on the solid raw material, thereby preparing a fluid kneaded mixture, and then molding the mixture into a prescribed shape.

(2) An apparatus for manufacturing molded materials solidified by sulfur, comprising an apparatus for heating and drying a raw material to be mixed with sulfur, such as slag resulting from steel-making and dust resulting from steel-making, an apparatus for heating and kneading the mixture of raw materials including molten sulfur, and a molding apparatus for molding a mixture of the solid raw material and the molten sulfur into a prescribed shape.

According to the present invention, a solid raw material, such as slag resulting from steel-making, dust resulting from steel-making and dust of incinerated wastes, can be solidified and sealed with sulfur quite effectively and positively, at this time, by suppressing the occurrence of sulfurous acid gas during heating to melt, a molded material solidified by sulfur that is high in physical strength can be obtained. In particular, according to the present invention, from a waste containing harmful heavy metal species, a molded material solidified by sulfur from which the oozing out of the harmful heavy metal species is completely prevented, can be obtained. The molded materials solidified by sulfur large in specific gravity and high in physical strength are useful as ballasting materials. The molded materials can be used as a raw material to produce molded articles further processed.

The apparatus for manufacturing molded materials of the present invention is effective to produce a molded item solidified by sulfur, continuously.

Now, the present invention will be described based on embodiments shown in the figures.

Figure 1:
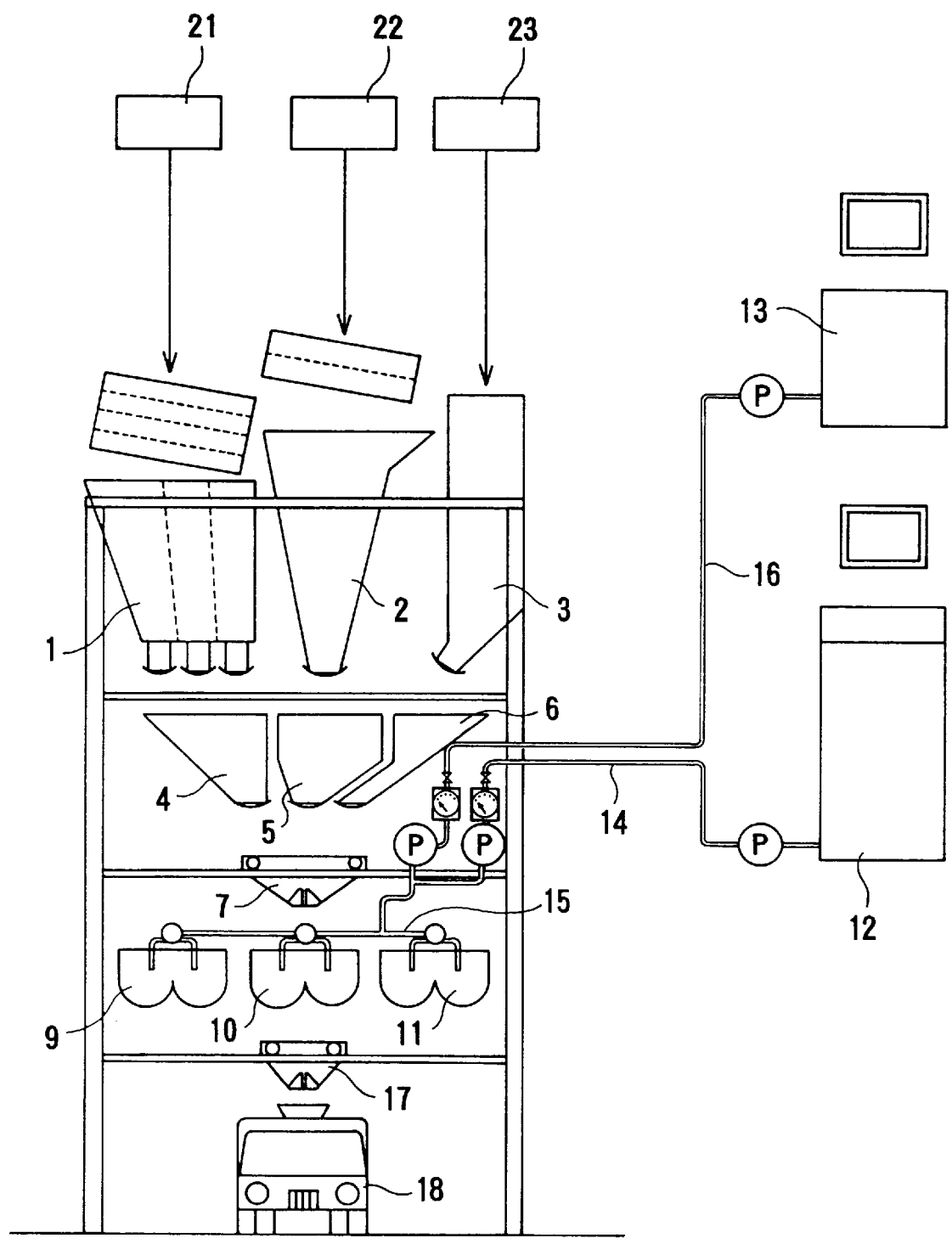
FIG. 1 is a view illustrating an embodiment of the apparatus for manufacturing molded materials solidified by sulfur, according to the present invention.

FIG. 1 shows a view illustrating an embodiment of the apparatus for manufacturing molded materials solidified by sulfur, according to the present invention.

In FIG. 1, 1 indicates a hopper for slag resulting from steel-making; 2 indicates a hopper for incineration ash; 3 indicates a hopper for dust resulting from steel-making; and 4, 5, and 6 indicate metering tanks for the raw materials (slag resulting from steel-making, incineration ash, and dust resulting from steel-making) from the respective hoppers 1, 2, and 3. In the metering tanks, the raw materials are metered, and the metered raw materials are fed to a feeder (e.g. a movable metering feeder) 7. Further, 21, 22, and 23 indicate heating and drying apparatuses for the raw materials other than sulfur, which apparatuses are provided with burners or the like, using such a fuel as heavy oil, and they are such heating and drying apparatuses as rotary kilns. In the heating and drying apparatuses, the raw materials other than sulfur are heated to temperatures of the order of 120 to 200° C., and their water contents are brought to 3% by weight or below, preferably 1.5% by weight or below, and more preferably 1% by weight or below.

In the figure, additionally, 9, 10, and 11 indicate kneaders, into which the raw material mixture, in a prescribed amount, is fed from the feeder 7; 12 indicates a tank for sulfur as another raw material that will be charged into the kneaders 9, 10 and 11; and 13 indicates a tank for an additive. Sulfur is heated in the tank 12 to a prescribed temperature, and prescribed amounts of the sulfur are fed into the kneaders 9, 10, and 11, through pipes 14 and 15. The tank 12 may be provided with an apparatus for deodorizing, if necessary. Further, an additive is appropriately fed through pipes 16 and 15. Herein, the additive can be one that serves to delay the solidification of sulfur.

After the mixture from the feeder 7, and the sulfur and the additive through the pipe 15 are charged into the kneaders 9, 10, and 11, they are kneaded.

In reference to the kneaders 9, 10, and 11, to select a type of kneader, it is suitable to select a kneader by placing importance on a time that allows the molten sulfur to penetrate adequately into aggregates (slag, dust, etc., they act as if aggregates in concrete). Any type of kneader can be used, such as a single-screw kneader, a double-screw kneader, a batch-type kneader, and a continuous-type kneader, and it is usual to use a double-screw pug mill-type circulation kneader of a batch type, wherein tracks of paddle tips are overlapped to carry out uniform mixing. In the kneaders used in the present invention, it is required to adopt a system that allows molten sulfur to penetrate into aggregates satisfactorily by taking as much time as is necessary.

However, in the case of the sulfur mixture in this invention, sulfur in the kneaded mixture is oxidized little, and mixing for a period as long as several minutes to several tens of minutes allows sulfur to penetrate into pore spaces on the aggregate, thereby enabling a good-quality sulfur mixture to be produced.

Further if the kneader for the sulfur mixture is provided with a variable-speed apparatus, such as an inverter, so that various types of aggregates may be mixed, a good-quality sulfur mixture can be produced with reduced wear of the kneader, reduced power consumption, and at low cost.

More importantly, the raw materials in the kneader during the mixing must be kept generally at about 95 to 150° C., and at not more than about 160° C., and preferably at 115 to 140° C. Accordingly, it is preferable to jacket the outer circumference of the kneader an insulating material and to heat the kneader wall by a heat source, such as an electric heater, a heating medium oil, or steam. Further, since it is needed to suck out dust and harmful gases that are generated in the kneader during the mixing when a toxic waste is treated, sometimes the inside of the kneader is heated in order to prevent lowering of the temperature due to the suction.

It is suitable for the apparatus and the system of the present invention that the order of the feeding of the raw materials into the kneaders can be arbitrarily changed. Thereby, a change in the type of material and a change in formulation can easily be coped with. Depending on the type of material and the formulation, in some cases, sulfur penetrates into the aggregate in a large amount during the mixing. In such a case, if the required sulfur is fed into the kneader all at once, since the state in the kneader becomes water-like and the mixture is apt to leak, for example, from the sealed sections of the shaft and the discharge gate, or the mixture is sometimes splashed up by the mixing blades in the kneader, the sulfur is preferably fed into the kneader in plural divided portions.

Since, in the sulfur mixture, use is made of a material that facilitates abrasion, such as slag of iron and steel, preferably the mixing blades and the case liner of the kneader are made of an abrasion-resistant cast iron, a ceramic, etc.

In the present invention, the kneader is preferably of a batch type. A batch-type kneader gives the advantage that dehydrated and heated materials held in the insulated hoppers can be charged into the kneaders, with changing the order of the charging in accordance with the purpose.

Various orders of charging can be selected; for example, (1) a method wherein dust having fine particle diameters, waste, and sulfur are kneaded, and thereafter coarse particles of slag and waste are charged, followed by kneading; (2) a method wherein fine particles of dust and coarse particles of slag are mixed and sulfur is charged into the mixture, followed by kneading, to complete the kneading; and (3) a method wherein coarse particles, fine particles, and sulfur are charged all at once, and kneading is then completed.

The penetration of liquid sulfur into pore spaces on the solid raw materials can be carried out by adjusting the temperature condition, stirring speed, and residence time during kneading.

In the kneader used in the present invention, it is required that liquid sulfur diffuses, with the sulfur having affinity for all the surface layers of dehydrated and dried solids (water content of 3% or less by weight). Therefore, it is important for the mixing time and the temperature of the material to be kept within certain ranges. That is, since the physical properties of liquid sulfur are 11 cp and 7 cp at 119 to 159° C., this temperature range must be kept. At 159° C. or over, the viscosity increases sharply, and at 187° C. it is $10^5$ cp, at which the sulfur is nearly an elastomeric material. At 119° C. it becomes a solid of a monoclinic system, and at 112° C. it becomes a solid of a rhombic system. At normal temperatures, it becomes an $S\alpha$:$S_8$ cyclic solid (of a rhombic system), which is most stable, and when Sliq→$S\alpha$, due to the affinity with heavy metals, such as Fe and Mn, their coexistence is bound to influence the stability and contraction property of $S\alpha$.

In the FIG. 1, 17 indicates a movable meter, and 18 indicates a cooker vehicle. The fluid kneaded mixtures prepared in the kneaders 9, 10, and 11 are transferred from the kneaders, through the movable hopper 17 for sulfur-solidified material, to the cooker vehicle 18. In some cases, if necessary, the fluid mixture is discharged, to be poured into a mold to be molded into a shape of a cylinder or a panel, for example, to form a stake or a pile, in which shape, if necessary, reinforcement steel is placed in the molded material. In other cases, the fluid kneaded mixture is discharged, to be molded and solidified into a desired shape. Alternately, in order to obtain a material in the form of crushed stone or sand, to meet the purpose of application of the sulfur-solidified material, an apparatus may be chosen in which a motor-driven sieve is placed downstream of the path of the flow of the fluid mixture (at 140 to 120° C.), to form particles with sizes in conformity with the openings of the sieve, and the particles are plunged into water to be solidified (water-granulated). A movable heat-resistant belt conveyor may also be placed below the sieve, to allow particles with desired sizes to be grouped, gradually cooled, and solidified, thereby producing gradually cooled materials solidified by sulfur.

The case wherein the molding and cooling of the fluid mixture are carried out by water granulation or gradual cooling is now described further.

According to water granulation, the fluid mixture having a high temperature (140 to 120° C.) is abruptly cooled with water, to be crushed, and a sulfur-solidified material, most of whose masses have sides 50 mm or below in length, is obtained. The water-granulated sulfur-solidified material is small in particle diameter and can be crushed further to about sizes of sand grains, and the shapes of the obtained granules are not uniform and resemble the shapes of crushed coke. The physical strength of the masses of the sulfur-solidified material obtained by water granulation is low, and therefore the masses can be crushed easily to smaller sizes, to be used as a fine aggregate (sand-like particles: 5 to 0.3 mm). Since the water-granulated sulfur-solidified material is not uniform in particle diameter, and the outer surface of the granules is rugged, if the water-granulated sulfur-solidified material is added to sand or gravel, the resulting mixture can be very easily made compact and is suitable, for example, as a high-load-bearing earth filling material for beaches.

On the other hand, according to gradual cooling, the solidified material after the cooling becomes single mass, which is high in specific gravity and high in physical strength. When the mass is crushed and the sizes of the particles are chosen, a coarse aggregate (40 to 5 mm) can be obtained. Since the gradually cooled sulfur-solidified material is high in physical strength and large in specific gravity, it can be used, for example, as a filler in concrete caissons.

Further, when the finely crushed solidified material is heated to from 120° C. to 140° C. (but not higher), it can be easily remelted and fluidized. The remelted sulfur-solidified material can be easily molded into a prescribed shape; for example, into a plate or a cylinder, such as a stake or a pile, by pouring it into a prescribed mold. In this case, if the molded product is a large-sized product small in surface area, since the heat conductivity is small, it is resistant to being remelted.

In the present invention, examples of raw materials to be incorporated into the sulfur-solidified material include, for example, slag resulting from steel-making, dust resulting from steel-making, and industrial waste containing harmful substances, and particulars thereof and compositions when they are processed are described, for example, in JP-B (JP-B means examined Japanese patent publication) Nos. 51440/1987, 15759/1986, 15274/1987, and 49680/1990.

There are no particular restrictions on the composition and the type (the origin) of slag resulting from steel-making and dust resulting from steel-making for use in the present invention other than the matter above described. If the composition or the like of these raw materials is varied a little, stable solidification and sealing can be effected according to the present invention.

Slag resulting from steel-making is open-hearth furnace slag or convertor slag produced in the process of making steel by an open-hearth furnace or a convertor. Generally, slag resulting from steel-making has the water content of 4 to 5%.

Dust resulting from steel-making is a powder material that is collected in a dust collector in the process of making steel, for example, in a open-hearth furnace plant or a convertor plant. Although the major component of dust resulting from steel-making varies depending on the formation conditions, it is mostly iron oxide, and the dust contains toxic materials, such as Cr, Cu, As, Pb, and Zn. Generally, dust resulting from steel-making has the water content of 4 to 10%.

Examples of the compositions of slag resulting from steel-making and dust resulting from steel-making that can be used in the present invention are as follows:

TABLE 1

| | Slag resulting from steel-making | | | | |
|---|---|---|---|---|---|
| | T-Fe | FeO | $SiO_2$ | CaO | M-Fe |
| A. | 16.4% | — | 13.0 | 44.0 | 2.4 |
| B. | 58.8% | 12.4 | 5.6 | 24.3 | — |
| C. | 24.6% | — | 12.8 | 31.0 | — |

TABLE 2

| | Dust resulting from steel-making | | | | |
|---|---|---|---|---|---|
| | T-Fe | FeO | $SiO_2$ | CaO | M-Fe |
| A. | 68.5% | 69.5 | 0.9 | 2.9 | 12.0 |
| B. | 59.8% | 14.8 | 4.5 | 3.8 | — |
| C. | 61.9 | 3.0 | 1.2 | 2.3 | — |
| | ~63.4% | ~4.8 | ~2.0 | ~3.8 | |

Note: "T-Fe" represents the total iron content of iron-containing components, such as Fe, $Fe_2O_3$, FeO and FeS, and the T-Fe is represented in terms of $Fe_2O_3$. "M-Fe" means a content of metal iron.

Examples of waste containing hazardous- or toxic-substances, which can be used in the present invention, include industrial-wastes containing toxic substances; dust (collected dust) released from metal-melting, refineries, and the like; dust (sludge) resulting from the treatment of industrial wastewater; dust or bottom ash resulting from incinerating residential or commercial garbage; ground materials of defective electric apparatuses and appliances resulting from the production of electric apparatuses and appliances; and ground materials of waste electric apparatuses and appliances (e.g. fluorescent lamps and batteries) retrieved from the market. These dusts in a small amount can be used with dust and slag resulting from steel-making, and the amount of these dusts to be used may be generally 5 to 10% by weight in the total solid raw materials including dust and slag resulting from steel-making.

The sulfur used as a raw material in the process of the present invention need not always be highly pure, and sulfur formed concomitantly in a process of desulfurization, for example, in plants that produce coke, make steel, or refine petroleum, can well serve.

In the present invention, a molded material solidified by sulfur is composed of sulfur and a raw material selected from dust resulting from steel-making, slag resulting from steel-making, and other wastes. With respect to the physical properties of the molded material solidified by sulfur, the specific gravity varies depending on the content of iron in the raw material. When the mixing ratio of sulfur and dust and slag resulting from steel-making is varied to obtain desired molded materials, the relationship between the specific gravity of raw materials and the total iron content of the obtained molded materials is shown in Table 3 below, by way of example.

The total iron content of the dust and slag resulting from steel-making out of the raw materials used in molded materials shown in Table 3 is mainly attributed to $Fe_2O_3$. For example, with regard to the total iron content (T-Fe) in dust resulting from steel-making, the T-Fe of open hearth furnace dust is 45 to 68.5%, and the T-Fe of converter dust is 62 to 63%. On the other hand, for example, with regard to the T-Fe in slag resulting from steel-making, the T-Fe of open hearth furnace slag is 16.5 to 59%, and the T-Fe in converter slag is 24.6%, which T-Fe will vary depending on the pretreatment method.

In dust and slag resulting from steel-making, the particle distribution has a range, and dust resulting from steel-making has a maximum particle distribution of 0.07 to 1 mm, while slag resulting from steel-making has a maximum particle distribution of 0.25 to 4 mm.

The physical strength of the molded material solidified by sulfur is influenced greatly by the width of the particle distribution, and an optimum constitutional ratio ranging from fine particles to coarse particles is required for physical strength. Examples of constitutional ratios related to uniaxial compressive strength are also shown in Table 3.

resulting solidified molded material. On the other hand, the smaller the amount of sulfur to be used within the above-described range is, the higher the specific gravity and physical strength of the resulting solidified molded material are.

Raw materials to be used in the present invention are preferably, (1) sulfur and slag resulting from steel-making, and more preferably (2) sulfur, slag resulting from steel-making and dust resulting from steel-making. The ratio of the used amount of these raw materials are; in the case of (1), the amount of the slag resulting from steel-making to sulfur of 100 parts by weight is preferably 100 to 1,500 parts by weight, more preferably 200 to 800 parts by weight, and particularly preferably 300 to 500 parts by weight; in the case of (2), the amount of the slag resulting from steel-making to sulfur of 100 parts by weight is preferably 50 to 1,500 parts by weight, more preferably 50 to 500 parts by weight, and particularly preferably 100 to 300 parts by weight, on the other hands, the amount of the dust resulting from steel-making to sulfur of 100 parts is preferably 30 to 900 parts by weight, more preferably 60 to 650 parts by weight, and particularly preferably 100 to 450 parts by weight. If slag resulting from steel-making and dust resulting from steel-making are excessive, the viscosity of the molten mixture may be lowered and the physical strength of the solidified molded item may also be lowered. Further, in that case, the mixing and melting of the raw material, such as slag resulting from steel-making, and sulfur may become

TABLE 3

| | Amount of raw material to be used (part by weight) | | | | | Particle Size of the used raw material | | |
|---|---|---|---|---|---|---|---|---|
| | Sulfer (1.98*[1]) | Dust resulting from steel-making (1.82–5.2*[1]) | Slag resulting from steel-making (2.04–5.2*[1]) | Specific gravity | T-Fe (%) | Dust resulting from steel-making (mm) | Slag resulting from steel-making (mm) | Uniaxial compressive strength (kg/cm$^2$) |
| A1 | 2 (4.98*[2]) | 1 (2.72*[2]) | 5 (3.14*[2]) | 2.69 | 26.41 | 0.07–0.1 | 0.25–1.0 | 174 |
| A2 | 2 (1.98*[2]) | 1 (2.72*[2]) | 5 (3.14*[2]) | 2.69 | 26.41 | 0.07–0.1 | 2.0–3.5 | 306 |
| B1 | 2 (1.98*[2]) | 2 (3.86*[2]) | 2 (4.3i*[2]) | 3.36 | 37.29 | 0.07–0.1 | 0.25–1.0 | 347 |
| B2 | 1 (1.98*[2]) | 2 (3.83*[2]) | 2 (4.31*[2]) | 3.36 | 37.29 | 0.07–0.1 | 2.0–3.5 | 478 |
| C1 | 1 (1.98*[2]) | 2 (5.09*[2]) | 3 (5.17*[2]) | 4.06 | 48.91 | 0.07–0.1 | 0.25–1.0 | 512 |
| C2 | 1 (1.98*[2]) | 2 (5.09*[2]) | 3 (5.17*[2]) | 4.06 | 48.91 | 0.07–0.1 | 2.0–3.5 | 650 |

Note:
*[1]These values mean the range of specific gravity of each raw material.
*[2]These values mean specific gravity of the used raw material.

In the present invention, the mixing ratio of sulfur with a solid raw material other than sulfur, such as slag and dust resulting from steel-making, is not particularly restricted as long as it falls in the range wherein toxic substances in the raw material other than sulfur is solidified and sealed (blocked) satisfactorily with sulfur. The weight ratio of sulfur to the solid raw material other than sulfur is preferably (3:1) to (1:8), more preferably (3:7) to (1:5), further more preferably (1:3) to (1:5), and particularly preferably (1:4) to (1:5). When the amount of the solid raw material other than sulfur is small, that is, the amount of sulfur is rather a large amount, within the above-described range, heavy metals in the resulting solidified molded material can be more efficiently sealed and it is more easy to remelt and process the unsatisfactory, sometimes resulting in failure of the treatment of toxic substances. If the amounts of slag resulting from steel-making and dust resulting from steel-making are too small, the specific gravity of the solidified molded item may be decreased and the physical strength thereof may be lowered.

Further, in the present invention, into the solid raw material to be mixed and kneaded with molten sulfur, may be added shredder dust, in an amount that does not impair the properties of the sulfur-solidified material; for example, in an amount of about 55% by weight or below, and preferably 30% by weight or below, based on the solid raw material. The term "shredder dust" means dust formed when waste automobiles or the like are crushed finely by a crusher for final disposal treatment, and shredder dust may take various forms, such as the forms of grinds and powdery dust. Components of shredder dust include, for example, resins, rubbers, fibers, foamed urethane, iron, mercury, lead, and paints, and particularly heavy metals contained in shredder dust present a problem in view of waste material treatment.

Figure 2:
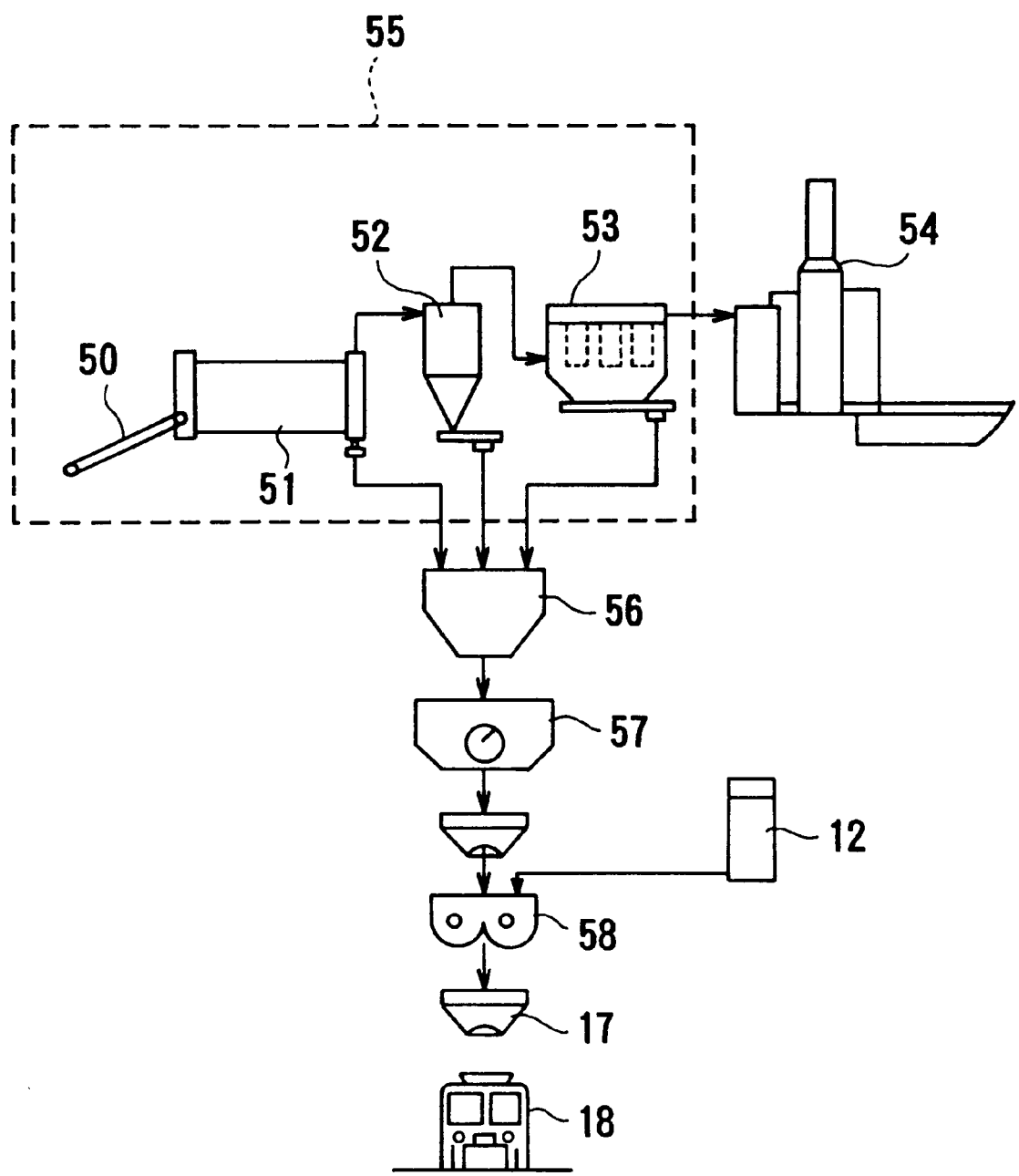
FIG. 2 is a view illustrating another embodiment of the apparatus for manufacturing molded materials solidified by sulfur according to the present invention.

Further, raw materials to be used other than sulfur; that is, including slag resulting from steel-making, dust resulting from steel-making, EP dust (that is, dust collected from electrostatic precipitator), and harmful-heavy-metal-containing sludge dried material (e.g. titanium waste slag), which materials contain a fine powder, are splashed in all directions in the practical processing step, in some cases. Since these contain harmful heavy metals, it is required to provide an apparatus for removing the generation of secondary pollution. In this case, as shown in FIG. 2, three-step processing can be used, in such a manner that, after the raw material 50 is dried by a dryer 51, dust is removed by a cyclone 52; fine powder is removed by a bag filter 53; and finally a wet-type scrubber 54 is used for the purpose of deodorization and dust removal.

In the figure, section 55 within the broken-line is provided with juxtaposed rows, or three rows, in conformity with the purpose of application, i.e. for slag, dust, and waste.

In the figure, 56 indicates a hopper, 57 indicates a metering tank, and 58 indicates a mixer. In the figure, the same reference numeral indicates the same member in FIG. 1.

The present invention is now described in more detail based on the example.

EXAMPLE

Example 1

By using the following raw materials, materials solidified by sulfur were produced.

1) Slag resulting from steel-making: 500 g of so-called converter slag was prepared.

Particle diameter: 4.0 to 0.25 mm gradually cooled slag (ID-C3)
Water content: shown below
Bulk specific gravity: 2.04 g/cm$^2$
T-Fe: 58.8%

2) Dust resulting from steel-making: 400 g was prepared.

Particle diameter: 1.0 to 0.25 mm magnetically separated powder (LD-OB)
Water content: shown below
Bulk specific gravity: 1.82 g/cm$^2$
T-Fe: 59.8%

3) As sulfur, sulfur obtained in desulfurization in refining of petroleum, which sulfur had a purity of 99.5% or over, was used, in an amount of 400 g. Naturally, this sulfur was free from moisture. Generally this sulfur is stored in a liquefied state by heating it to 120±5° C.

Before mixing and melting the sulfur, the water content of the slag resulting from steel-making and the dust resulting from steel-making was brought to 1% or below, about 3%, about 7%, or about 10%, respectively, based on the total amount, and they were kneaded. The three components were added approximately simultaneously and were kneaded at 120 to 130° C. for 20 min, using a double-screw pug mill-type circulation kneader. The thus obtained molded materials were tested with respect to oozing out of heavy metals and physical strength, according to the following methods. Further, the specific gravity of the thus obtained molded materials was measure.

(1) Test method for oozing out of heavy metals

Each of the obtained molded materials solidified by sulfur was ground to particles, and the obtained particles were passed through a sieve to collect the particles having particle diameter of 0.5 to 5 mm, to prepare Sample. The thus prepared Sample was brought into pure water being adjusted its pH value to 5.8 or higher but 6.3 or below, so that the content of Sample became 10% (w/v) and the total amount of the mixture of Sample in water was made to at least 500 ml. This mixture was stirred at 20° C. by using a stirrer, the width of stirring being 4 cm or more but 5 cm or less at stirring speed of 200 times/min. for 6 hours, thereby to carry out oozing out of heavy metals from the molded material solidified by sulfur into water. The resulting liquid was filtered through a filter having a pore diameter of 1 μm, to prepare Test liquid. Oozing out of each heavy metals in the Test liquid was measured according to the method described in the notification No. 13 from the Environment Agency, such as the atomic absorption spectrometry shown in JIS K 0102.

With respect to the degree of pollution for the criteria for soil environment, the measurement was carried out according to the method described in the notification No. 46 from the Environment Agency, by using Sample prepared in the same manner as descried above except that the particle diameter of Sample was made 2 mm or less.

(2) Test method for physical strength

As a scale of physical strength of Sample, uniaxial compressive strength of each Sample prepared in the above (1) was measured according to JIS A 1108.

The results are shown in Table 4.

TABLE 4

| Experiment No. | 1 | 2 | 3 | 4 |
|---|---|---|---|---|
| Water content | 1% | 3% | 7% | 10% |
| State at the time of kneading | | Kneading and melting could be done with little abnormality | | During the kneading and melting, foaming occurred within the mixture |
| Generated gas | | During the mixing and melting, generation of an irritating odor was poor | | During the mixing and melting, an irritating odor due to the smell of sulfur dioxide gas was remarkably generated, and therefore a deodorizing apparatus was required to be installed |
| Oozing out of heavy metals* | | Oozing out of heavy metals from the material solidified by sulfur into water was little | | Oozing out of heavy metals from the material solidified by sulfur become much and components in amounts exceeding the criteria for waste oozed out |
| | | At or below the criteria for soil environ- | At or below the criteria for oozing of harmful | Some components of Zn, As, Pb, etc. exceeded the criteria for oozing out of harmful heavy |

TABLE 4-continued

| Experiment No. | 1 | 2 | 3 | 4 |
|---|---|---|---|---|
| | ment | heavy metals, etc. | metals | |
| | Hg <0.0005 mg/l | Hg <0.005 mg/l | Hg 0.005 to 0.01 mg/l | |
| | Pb <0.01 mg/l | Pb <0.3 mg/l | Pb 0.3 to 0.5 mg/l | |
| | As <0.01 mg/l | As <0.3 mg/l | As 0.3 to 0.5 mg/l | |
| Uniaxial compressive | 300 kg/cm² | 280 kg/cm | 200 kg/cm² | 180 kg/cm² |

TABLE 4-continued

| Experiment No. | 1 | 2 | 3 | 4 |
|---|---|---|---|---|
| strength | | | | |
| Specific gravity | 3.51 | 3.28 | 2.34 | 2.11 |

Note:
*Oozing-out amounts of heavy metals from the raw materials before solidifying with sulfur are Hg 0.005 mg/l; Pb 3.0 mg/l; and As 1.0 mg/l.

In Experiment Nos. 1 and 2, a rise of viscosity under melting condition during mixing occurred remarkably, whereas in, Experiment Nos. 3 and 4, a rise of viscosity under melting condition did not occur due to the water contained.

When three components, i.e. dust and slag resulting from steel-making, and sulfur, were kneaded, with the water content before the mixing and melting being over 3%, it happened that steam and sulfurous acid gas were generated by heating at a temperature higher than 120° C., and the inner pore spaces in the kneaded material were greatly increased, which seemed to result in lower physical strength. As a result, in such a system wherein water remained significantly in the solid raw material, the penetration of liquid sulfur into the solid phase became unsatisfactory. When the molded material solidified by sulfur was broken and the broken materials were shaken in water, by the method of judging the suppression of oozing out of toxic heavy metals, it was recognized that toxic heavy metals leached out.

As is apparent from the results shown in Table 4, if the water content at the time of mixing and melting exceeds 3%, an irritating odor due to the smell of sulfurous acid gas became strong, the uniaxial compressive strength of the material solidified by sulfur was under the same conditions, the oozing out of heavy metals could not be prevented, and therefore it can be understood that it is important to control the initial water content.

Example 2

Molded materials were manufactured in the same manner as Experiment No. 1 in Example 1, except that raw materials or their composition were changed as shown in Table 5 below. Physical properties of the molded materials were measured in the same manner as in Example 1. The results are shown in Table 5.

TABLE 5

| | (Amount of raw material to be used (part by weight)) | | | | | | | |
|---|---|---|---|---|---|---|---|---|
| Experiment No. | Sulfur | Dust resulting from steel-making | Slag resulting from steel-making | Gravel | Macadam | Fly ash*¹ | Specific gravity | Uniaxial compressive strength |
| 5*² | 1 | 2 | 3 | — | — | — | 4.06 | 650 kg/cm² |
| 6 | 1 | — | — | 2 | 3 | — | 2.50 | 128 kg/cm² |
| 7 | 1 | — | — | — | — | 5 | 2.31 | 68 kg/cm² |
| 8 | 1 | — | 5 | — | — | — | 2.12 | 27 kg/cm² |

Note:
*¹The used fly ash had the water content of 3%.
*²In Experiment No. 5, the raw materials and composition were the same as those described in column C2 in Table 3.

Having described our invention as related to the present embodiments, it is our intention that the invention not be limited by any of the details of the description, unless otherwise specified, but rather be construed broadly within its spirit and scope as set out in the accompanying claims.

What we claim is:

1. An apparatus for manufacturing material solidified by sulfur comprising:
   at least one hopper for receiving a raw material therein;
   a metering tank located downstream from said hopper for receiving said raw material from said hopper;
   a kneader located downstream from said metering tank for receiving said raw material from said metering tank;
   a first tank for containing sulfur therein in a melted state;
   first piping for transferring said sulfur in said melted state into said kneader, said kneader mixing said raw material with said sulfur in said melted state to produce a material mixture;
   means for solidifying the material mixture; and
   a metering device located downstream from said kneader, wherein said metering device is movable from a position directly beneath said kneader, to a position spaced from said kneader.

2. The apparatus according to claim 1, further comprising a second tank for containing an additive therein.

3. The apparatus according to claim 2, further comprising second piping for transferring said additive into said kneader.

4. The apparatus according to claim 1, further comprising a frame for supporting said hopper, said metering tank, and said kneader.

5. The apparatus according to claim 4, wherein said hopper is located above said metering tank, and said metering tank is located above said kneader.

6. The apparatus according to claim 5, further comprising a feeder located between said metering tank and said kneader.

7. The apparatus according to claim 6, wherein said feeder is movable from a position directly beneath said metering tank, to a position spaced from said metering tank.

8. The apparatus according to claim 1, further comprising a dryer located upstream from said hopper for drying said raw material.

9. The apparatus according to claim 1, wherein said first piping includes two output pipes for transferring said sulfur in said melted state into said kneader.

10. The apparatus according to claim 1, wherein said means for solidifying comprises a molding apparatus.

11. The apparatus according to claim 1, wherein said means for solidifying comprises a cooker vehicle.

12. The apparatus according to claim 1, further comprising:
- a feeder located between said metering tank and said kneader;
- a metering device located downstream from said kneader; and
- a frame for supporting said hopper, said metering tank, said feeder, said kneader, and said metering device.

13. The apparatus according to claim 1, further comprising:
- a dryer located upstream from said hopper for drying said raw material, said dryer having a first output directed to said hopper, and a second output;
- a cyclone having an input connected to said second output of said dryer, said cyclone having a first output directed to said hopper, and a second output; and
- a bag filter having an input connected to said second output of said cyclone, said bag filter having at least a first output directed to said hopper.

14. An apparatus for manufacturing material solidified by sulfur comprising:
- a plurality of hoppers for receiving raw materials therein;
- a plurality of metering tanks located downstream from each of said hoppers for receiving said raw materials from said hoppers;
- a plurality of kneaders located downstream from each of said metering tanks for receiving said raw materials from said metering tanks;
- a first tank for containing sulfur therein in a melted state;
- first piping for transferring said sulfur in said melted state into each of said kneaders, said kneaders mixing said raw materials with said sulfur in said melted state to produce material mixtures;
- means for solidifying the material mixtures;
- a frame for supporting said hoppers, said metering tanks, and said kneaders, wherein said hoppers are located above said metering tanks, and said metering tanks are located above said kneaders;
- a feeder located below said metering tanks and above said kneaders; and
- a metering device located downstream from said kneaders.

15. The apparatus according to claim 14, wherein said feeder is movable to positions directly beneath each of said metering tanks, and said metering device is movable to positions directly beneath each of said kneaders.

16. The apparatus according to claim 14, wherein for each of said hoppers, said apparatus further comprises:
- a dryer located upstream from said hopper for drying said raw material, said dryer having a first output directed to said hopper, and a second output;
- a cyclone having an input connected to said second output of said dryer, said cyclone having a first output directed to said hopper, and a second output; and
- a bag filter having an input connected to said second output of said cyclone, said bag filter having at least a first output directed to said hopper.

* * * * *